United States Patent
Sasaki et al.

(10) Patent No.: US 6,378,071 B1
(45) Date of Patent: *Apr. 23, 2002

(54) FILE ACCESS SYSTEM FOR EFFICIENTLY ACCESSING A FILE HAVING ENCRYPTED DATA WITHIN A STORAGE DEVICE

(75) Inventors: Takaaki Sasaki; Yusuke Yamanaka, both of Tokyo (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,942

(22) Filed: Feb. 26, 1998

(30) Foreign Application Priority Data

Feb. 28, 1997 (JP) .................................. 9-046724

(51) Int. Cl.$^7$ ................................ H04L 9/30
(52) U.S. Cl. ...................... 713/165; 713/193
(58) Field of Search ............... 380/4, 25, 49; 713/193, 165, 167, 200; 705/57; 707/203

(56) References Cited

U.S. PATENT DOCUMENTS 5,699,428 A * 12/1997 McDonnal et al. ............ 380/4
5,835,601 A * 11/1998 Shimbo et al. ............... 380/49
5,881,287 A * 3/1999 Mast .......................... 395/701

FOREIGN PATENT DOCUMENTS

JP 7-140896 6/1995

* cited by examiner

Primary Examiner—Gilberto Barrón, Jr.
Assistant Examiner—Ho S. Song
(74) Attorney, Agent, or Firm—Staas & Halsey LLP

(57) ABSTRACT

A file access system includes a file opening unit which opens a given file within an external storage device when a file opening request is issued by an application program. A determining unit determines whether a given file within the storage device has encrypted data when a reading request is issued by the application program. When the given file is determined as having the encrypted data, a reading unit receives a fixed length of the encrypted data from the given file and generates a block of decrypted data of the same size as the fixed length by performing a decryption wherein a position of the fixed length of the decrypted data is determined by a position indicated by the reading request.

14 Claims, 8 Drawing Sheets

FILE MANAGEMENT TABLE

| DRIVER NAME | HOOK ADDRESS |
|---|---|
| DRIVER #1 | FSHook ( ) ; |
| DRIVER #2 | FSHook ( ) ; |
| ⋮ | ⋮ |
|  |  |

FIG. 9

USER-LEVEL MANAGEMENT TABLE

| FOLDER NAME | READ PROCESSING | WRITE PROCESSING |
|---|---|---|
| FOLDER A | ○ | ○ |
| FOLDER B | ○ | × |
| FOLDER C | × | ○ |
| FOLDER D | × | × |
|  |  |  |

○ : ENCRYPTION-TYPE FOLDER
× : NON-ENCRYPTION-TYPE FOLDER

FILE ACCESS SYSTEM FOR EFFICIENTLY ACCESSING A FILE HAVING ENCRYPTED DATA WITHIN A STORAGE DEVICE

BACKGROUND OF THE INVENTION

(1) Field of the Invention

The present invention relates to a file access system which accesses a file within an external storage device when a request to read data from or write data to the file is issued by an application program.

(2) Description of the Related Art

In a conventional file access method, a given file within an external storage device is accessed when a request is issued by an application program in order to read data from or write data to the file. In a case in which a file having encrypted data (or ciphertext) is accessed, the whole ciphertext from the file is copied to a working file. The whole ciphertext in the working file is decrypted into plaintext (or decrypted data), and the plaintext is copied to the working file. After the decryption is performed, the working file is accessed to obtain the plaintext. After the accessing procedure is performed, the plaintext is encrypted, and the encrypted data is copied to the file within the external storage device.

More specifically, in the conventional file access method, when encrypted data of a file within the external storage device is read by an application program, all the encrypted data from the file is copied to a working file. After the encrypted data is decrypted into plaintext in the working file, the working file is accessed to return the plaintext to the application program. After the accessing procedure is performed, the plaintext is encrypted into the ciphertext and the ciphertext (or the encrypted data) is copied to the file within the external storage device.

Therefore, when a file having encrypted data within the external storage device is accessed according to the conventional file access method, it is necessary to generate a working file and decrypt the data of the file to store the result of decryption in the working file. This makes it difficult to efficiently access the file having encrypted data within the external storage device.

Further, in the case of the conventional file access method, the plaintext (or the decrypted data) in the working file remains unprotected after the accessing procedure is finished, and there is a problem in that the conventional file access method fails to provide adequate security for information of the file within the external storage device.

SUMMARY OF THE INVENTION

An object of the present invention is to provide an improved file access system in which the above-mentioned problems are eliminated.

Another object of the present invention is to provide a file access system which utilizes a simple accessing method and efficiently accesses a file within an external storage device even if the file has encrypted data.

Sill another object of the present invention is to provide a file access system which provides adequate security for information of a file within an external storage device even after the accessing procedure for the file is finished.

The above-mentioned objects of the present invention are achieved by a file access system in which a file within a storage device is accessed when a request is issued by an application program, the file access system comprising: a determining unit which determines whether a given file within the storage device has encrypted data when a reading request is issued by the application program; and a reading unit which receives a fixed length of the encrypted data from the given file when the given file is determined as having the encrypted data, the reading unit generating decrypted data of the same size as the fixed length by performing a decryption wherein a position of the fixed length of the decrypted data is determined by a position indicated by the reading request.

The above-mentioned objects of the present invention are achieved by a file access system in which a file within a storage device is accessed when a request is issued by an application program, the file access system comprising: a determining unit which determines whether a given file within the storage device has encrypted data when a writing request is issued by the application program; and a writing unit which receives a fixed length of the encrypted data from the given file when the given file is determined as having the encrypted data, the writing unit generating decrypted data of the same size as the fixed length by performing a decryption wherein a position of the fixed length of the decrypted data is determined by a position indicated by the writing request, and the writing unit overwriting new data from the application program to the decrypted data, and further the writing unit generating encrypted data of the same size as the fixed length by performing an encryption of the decrypted data, and overwriting the encrypted data to the given file at the position indicated by the writing request.

In the file access system of the present invention, a simple encryption/decryption method is utilized to carry out the read/write processing. It is not necessary for the present invention to generate a working file and encrypt/decrypt data of a given file to store the result of encryption/decryption in the working file. The file access system of the present invention can efficiently access the given file within the external storage device. Further, in the file access system of the present invention, it is difficult to discriminate between a block of encrypted data and a block of decrypted data since both blocks have the same size. Therefore, the file access system of the present invention is effective in providing adequate security for information of the given file within the external storage device even after the accessing procedure for the file is finished.

BRIEF DESCRIPTION OF THE DRAWINGS

The above and other objects, features and advantages of the present invention will become more apparent from the following detailed description when read in conjunction with the accompanying drawings in which.

DETAILED DESCRIPTION OF THE PREFERRED EMBODIMENT

A description will now be given of the preferred embodiment of the present invention with reference to the accompanying drawings.

Figure 1:
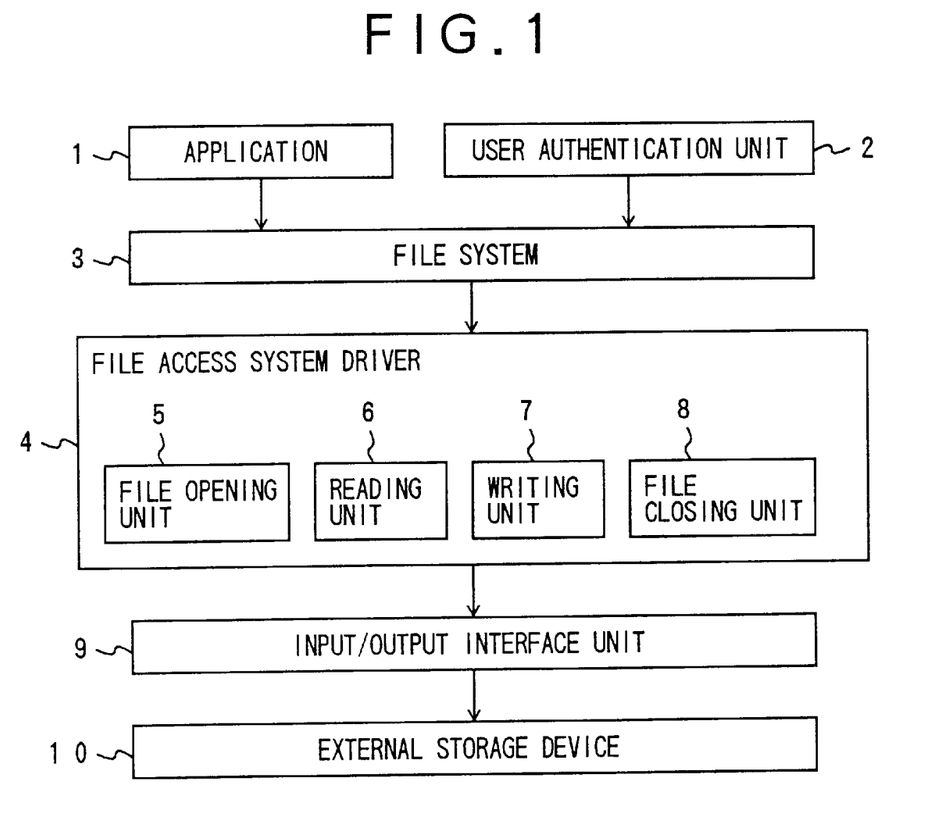
FIG. 1 is a block diagram of a file access system of the present invention.

FIG. 1 shows a configuration of a file access system of the present invention.

In FIG. 1, the file access system of the present invention is embodied in a file access system driver 4. An application 1 issues a request to a file system 3 in order to read data from or write data to a given file within an external storage device 10. The application 1 is an existing application program, and any modification of a source code of the application program is not needed when configuring the file access system of the present invention.

A user authentication unit 2 provides authentication of a user when an encryption/decryption processing for files within the external storage device 10 is performed, which will be described later with reference to FIG. 3.

In the file system 3, the file access system driver 4 carries out a file accessing procedure when a request is issued by the application 1, so that a given file within the external storage device 10 is accessed. The file system 3 is provided with an operating system (not shown in FIG. 1). The operating system provides a software platform on top of which the application 1 can run. Further, the file system 3 is provided with a central processing unit (CPU) and a memory, both of which are not shown in FIG. 1. The CPU carries out a processing according to the application 1 on top of the operating system in the file system 3, and the memory is used by the CPU when the processing according to the application 1 is performed.

The file access system driver 4 provides execution of various fundamental operations needed for the file accessing procedure. As shown in FIG. 1, the file access system driver 4 of the present embodiment comprises a file opening unit 5, a reading unit 6, a writing unit 7, and a file closing unit 8.

In the file access system driver 4, the file opening unit 5 causes the CPU to perform a file opening process to open a file within the external storage device 10, which will be described later with reference to FIG. 4.

The reading unit 6 causes the CPU to perform a reading process which will be described later with reference to FIG. 5. When a portion of a user-level management table (FIG. 9) for a folder containing a given file indicates that files in the folder have encrypted data, the reading unit 6 receives a fixed length of the encrypted data from the file and generates a block of decrypted data of the same size by performing the decryption. When the portion of the user-level management table for the folder indicates that the files in the folder have plaintext, the reading unit 6 returns the plaintext read from the file, to the application 1 without performing the decryption.

The writing unit 7 causes the CPU to perform a writing process which will be described later with reference to FIG. 6. When a portion of the user-level management table for a folder containing a given file indicates that files in the folder have encrypted data, the writing unit 7 receives a fixed length of the encrypted data from the file, generates a block of decrypted data of the same size by performing the decryption, and overwrites new data from a write buffer to the decrypted data. Further, the writing unit 7 receives a fixed length of the decrypted data from the data produced by the overwriting, and generates a block of encrypted data of the same size by performing the encryption, so that the resulting data is written to the file within the external storage device 10. When the portion of the user-level management table for the folder indicates that the files in the folder have plaintext, the writing unit 7 overwrites new data to the plaintext read from the file and writes the resulting data to the file within the external storage device 10 without performing the decryption/encryption.

The file closing unit 8 causes the CPU to perform a file closing process which will be described later with reference to FIG. 7.

In the file access system driver 4 of the present embodiment, a file accessing program related to the flowcharts of FIGS. 2–7 (which will be described later) is program code instructions stored in the memory of the file system 3. The memory of the file system 3 is, for example, a ROM (read-only memory). The memory corresponds to a computer readable medium in the claims. The computer readable medium includes any instruction storage device, such as for example, magnetic disks including floppy disks, optical disks including CD-ROMs, magneto-optical disks including MOs, semiconductor memory cards such as PC cards and miniature cards and other types of computer usable devices and media.

Further, in the present embodiment, the memory of the file system 3 may store encoded or non-encoded instructions. The instructions may first be installed from a floppy disk or a CD-ROM to a secondary memory (not shown) of the file system 3, transferred to a main memory (not shown) of the file system 3 and then read by the CPU. The memory of the file system 3 may store either all or a part of the program code instructions related to the flowcharts of FIGS. 2–7.

Referring back to FIG. 1, an input/output interface unit 9 provides an interface between the file access system driver 4 and the external storage device 10 when reading data from or writing data to a file within the external storage device 10. The external storage device 10 of the present embodiment is, for example, a hard disk drive (HDD) for a hard disk in which a plurality of files with either ciphertext or plaintext are stored.

Figure 2:
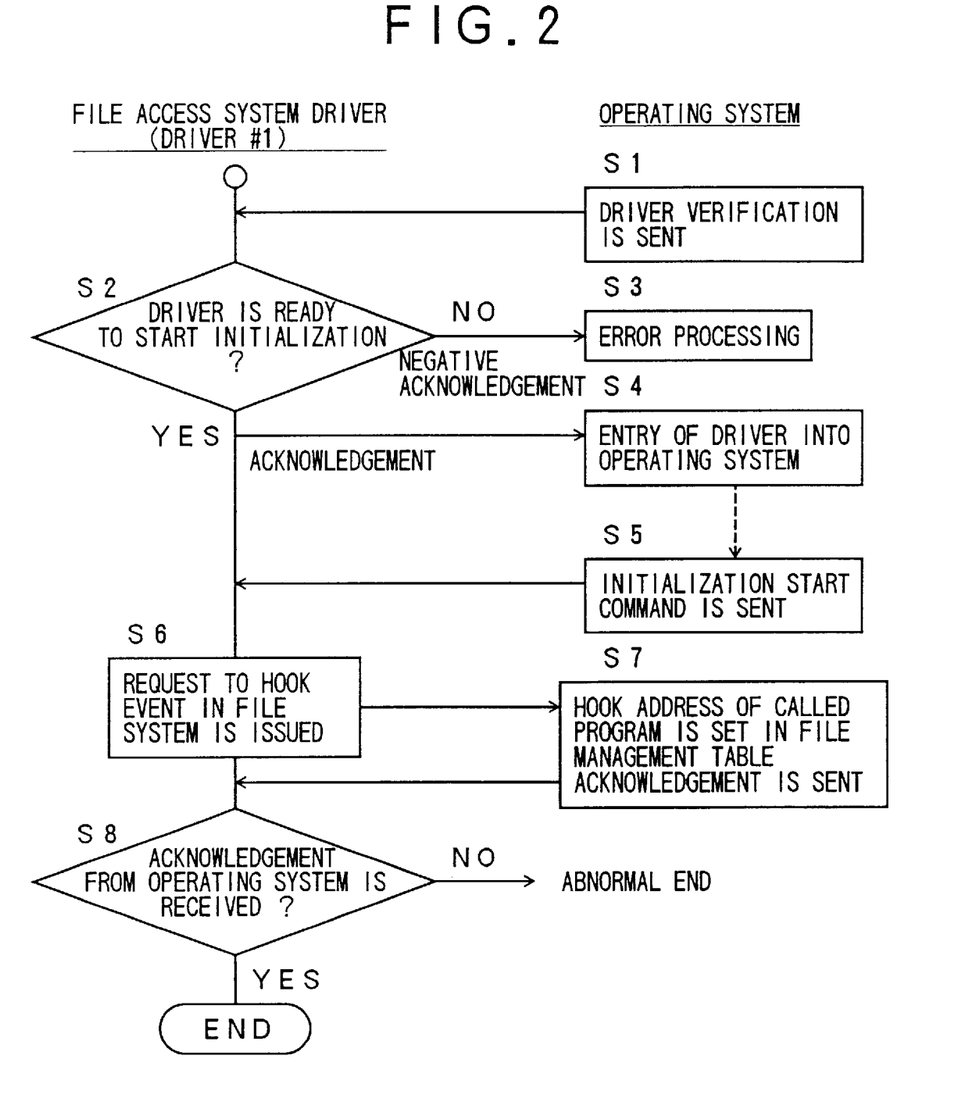
FIG. 2 is a flowchart for explaining an initialization processing performed by the file access system.

Next, FIG. 2 shows an initialization process performed by the file access system driver 4 of the present embodiment.

The file access system driver 4 of the present embodiment is, for example, a driver #1 which causes the CPU to perform a file accessing process according to the present invention. In the following, the file access system driver 4 of the present embodiment will be called the driver #1, for the sake of simplicity of description.

As shown in FIG. 2, the operating system transmits a driver verification to the driver #1 (S1). When the driver verification from the operating system is received, the driver #1 causes the CPU to determine whether the driver #1 is ready to start execution of the initialization process (S2).

When the result of the above S2 is negative, the driver #1 causes the CPU to return a negative acknowledgement of the received driver verification to the operating system. The operating system performs an error process when the negative acknowledgement is received (S3).

On the other hand, when the result of the above S2 is affirmative, the driver #1 causes the CPU to return an acknowledgement of the received driver verification to the operating system. When the acknowledgement is received, the operating system accepts entry of the driver #1 into the operating system (S4). After the entry of the driver #1 in the above S4 is performed, the operating system transmits an initialization start command to the driver #1 (S5).

When the initialization start command is received, the driver #1 causes the CPU to issue to the operating system a request to hook the event in the file system 3 (S6). Specifically, when the event in the file system 3 is hooked, the driver #1 causes the CPU in the above step S6 to notify the operating system of a hook address ("FSHook ( ); ") of a program being called.

When the request in the above S6 is received, the operating system sets a corresponding portion of a file management table (FIG. 8) for the driver #1 at the hook address of the called program (S7). The file management table is registered with the memory of the file system 3 by the operating system in the above step S7.

Figure 8:
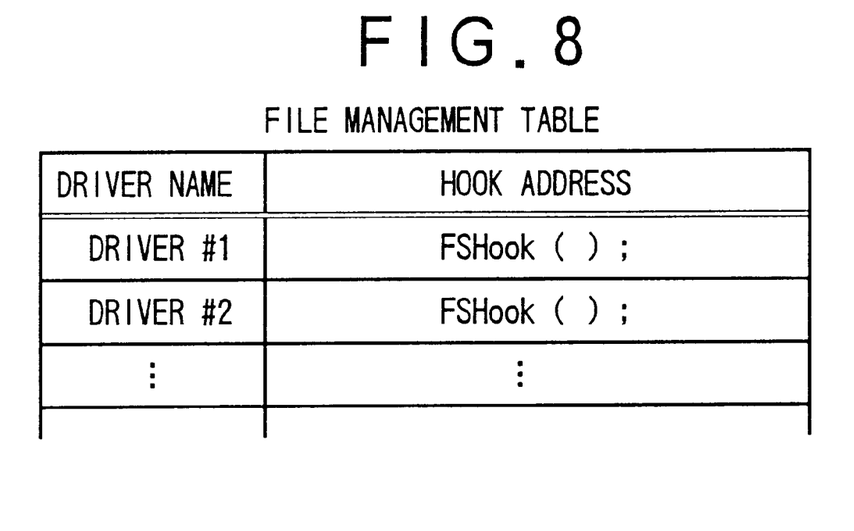
FIG. 8 is a diagram for explaining a file management table registered by an operating system during the initialization processing.

As shown in FIG. 8, in the file management table, the hook address ("FSHook ( ); ") of the called program with respect to the driver #1, and another hook address of a program being called with respect to another driver are registered with the memory of the file system 3. The file management table provides the hook address of the called program with respect to the related driver for the operating system.

After the portion of the hook address in the above S7 is performed, the operating system transmits an acknowledgement of the received request to the driver #1.

After issuing of the request in the above S6 is performed, the driver #1 causes the CPU to determine whether the acknowledgement from the operating system is received (S8). When the result of the above S8 is affirmative, the initialization process of FIG. 2 normally ends. In this case, the driver #1 is placed into a working condition for performing a file accessing procedure. On the other hand, when the result of the above S8 is negative, the initialization process of FIG. 2 abnormally ends. In this case, an error process is performed so as to ask the user to re-try the initialization or to provide the user with an error message.

Figure 3:
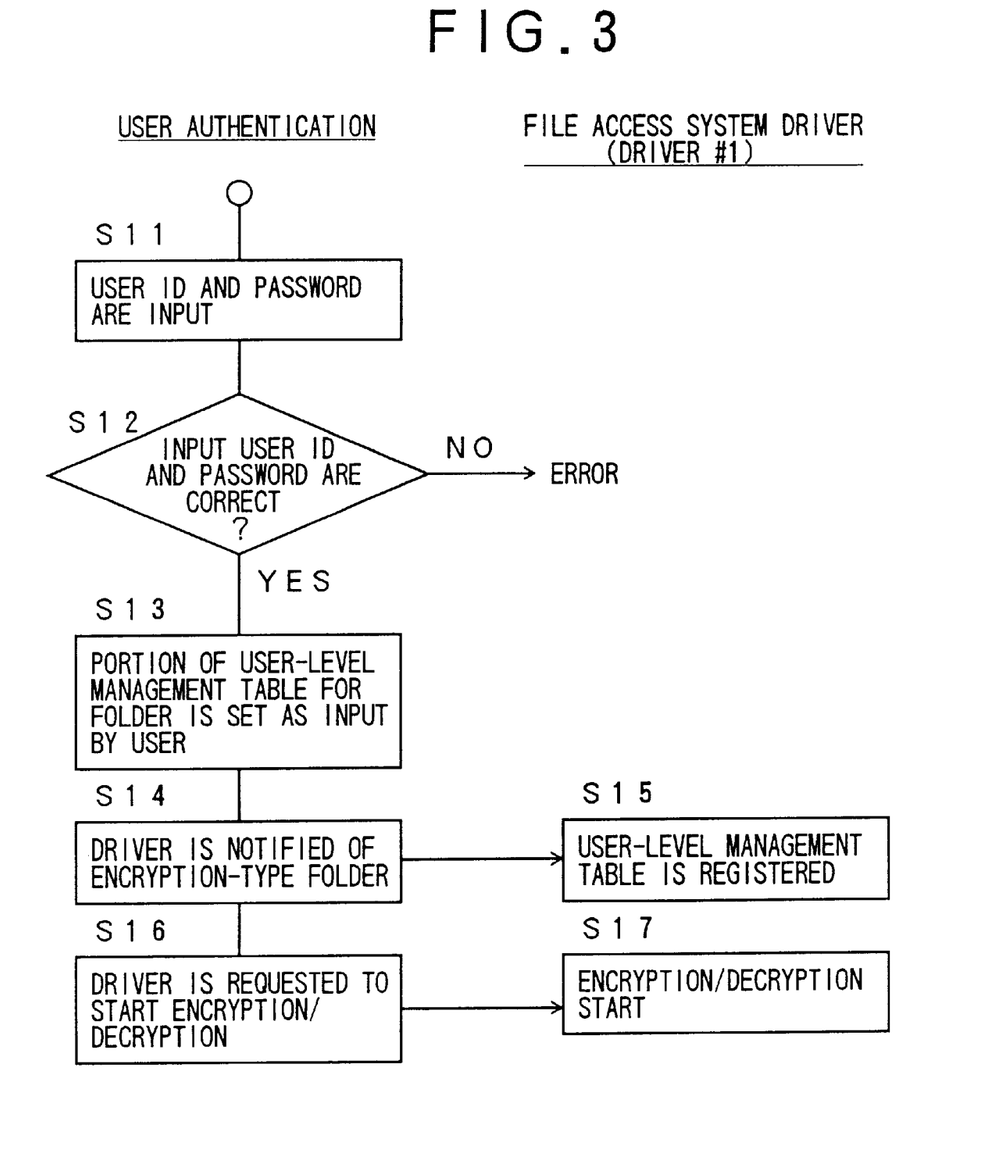
FIG. 3 is a flowchart for explaining an encryption/decryption processing performed by the file access system associated with a user authentication unit.

FIG. 3 shows an encryption/decryption process performed by the file access system driver 4 associated with the user authentication unit 2.

As shown in FIG. 3, when an encryption/decryption process for files in the external storage device 10 is performed by the file access system driver 4, the user authentication unit 2 causes the CPU to ask the user to input a user ID and a password (S11).

After input of the user ID and the password in the above step S11 is performed, the user authentication unit 2 causes the CPU to determine whether the input user ID and password accords with a registered user ID and password (S12).

When the result of the above S12 is affirmative, the user authentication unit 2 causes the CPU to set a corresponding portion of the user-level management table (FIG. 9) for a folder (or a file directory) of the external storage device 10 based on an input setting for the folder by the user or the application 1 (S13). The corresponding portion of the user-level management table for the folder is set to indicate that the files in the folder have encrypted data. The folder in this case is called an encryption-type folder. A different folder may be included in the external storage device 10, which contains files having plaintext only. Such a folder is called a non-encryption-type folder.

When the result of the above S12 is negative, the user authentication unit 2 causes the CPU to perform an error process so as to ask the user to re-try the inputting of a user ID and a password, or to provide the user with an error message.

After setting of the user-level management table in the above S13 is performed, the user authentication unit 2 causes the CPU to notify the driver #1 of the encryption-type folder for which the corresponding portion of the user-level management table has been set in the above S13 (S14).

When the notification in the above S14 is performed, the driver #1 causes the CPU to register the user-level management table, in which the corresponding portion for the folder is set as being the encryption-type folder, with the memory of the file system 3 (S15).

Figure 9:
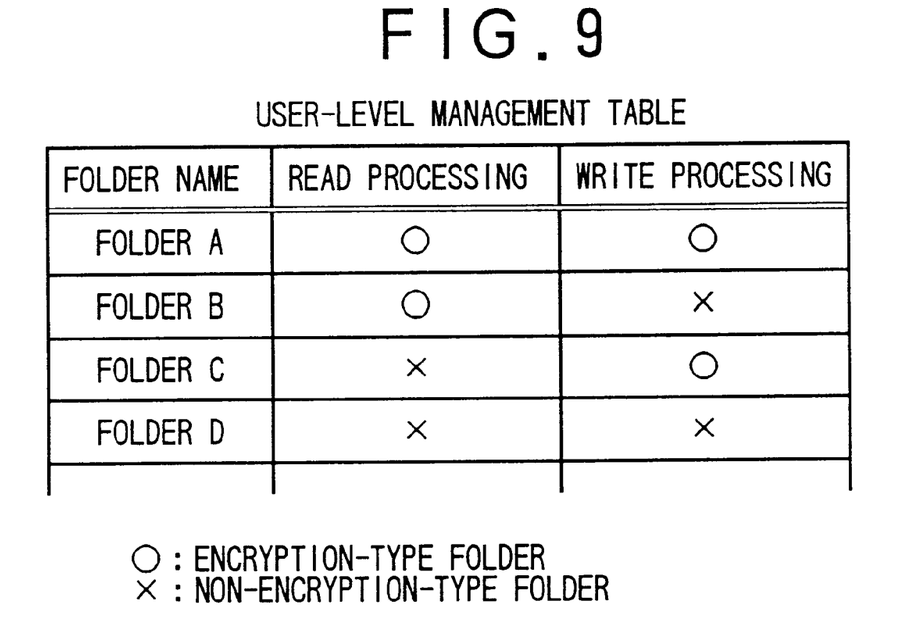
FIG. 9 is a diagram for explaining a user-level management table registered by the file access system during the encryption/decryption processing.

As shown in FIG. 9, a portion of the user-level management table for a folder indicates whether the encryption/decryption is to be performed after the reading/writing process during the file accessing procedure. In the user-level management table of FIG. 9, "o" indicates that the files in the folder have encrypted data (the encryption-type folder), and "x" indicates that the files in the folder have plaintext (the non-encryption-type folder). In the encryption-type folder, the encryption/decryption must be performed after the reading/writing process during the file accessing procedure. In the non-encryption-type folder, the encryption/decryption is not performed after the reading/writing process during the file accessing procedure.

After the notification in the above S14 is performed, the user authentication unit 2 causes the CPU to request the driver #1 to start the encryption/decryption (S16).

When the request in the above S16 is performed, the driver #1 causes the CPU to start the encryption/decryption for files in the folder of the external storage device 10 (S17).

Accordingly, the user authentication unit 2 provides authentication of a user, and, only against an authorized user, the file access system driver 4 causes the CPU in the above step S15 to register the user-level management table in which a corresponding portion for a given folder is set as being the encryption-type folder. The corresponding portion of the user-level management table for the given folder indicates whether the encryption/decryption must be performed after the reading/writing process during the file accessing procedure. Further, the file access system driver 4 causes the CPU in the above step S17 to start the encryption/decryption for files in the given folder of the external storage device 10.

Figure 4:
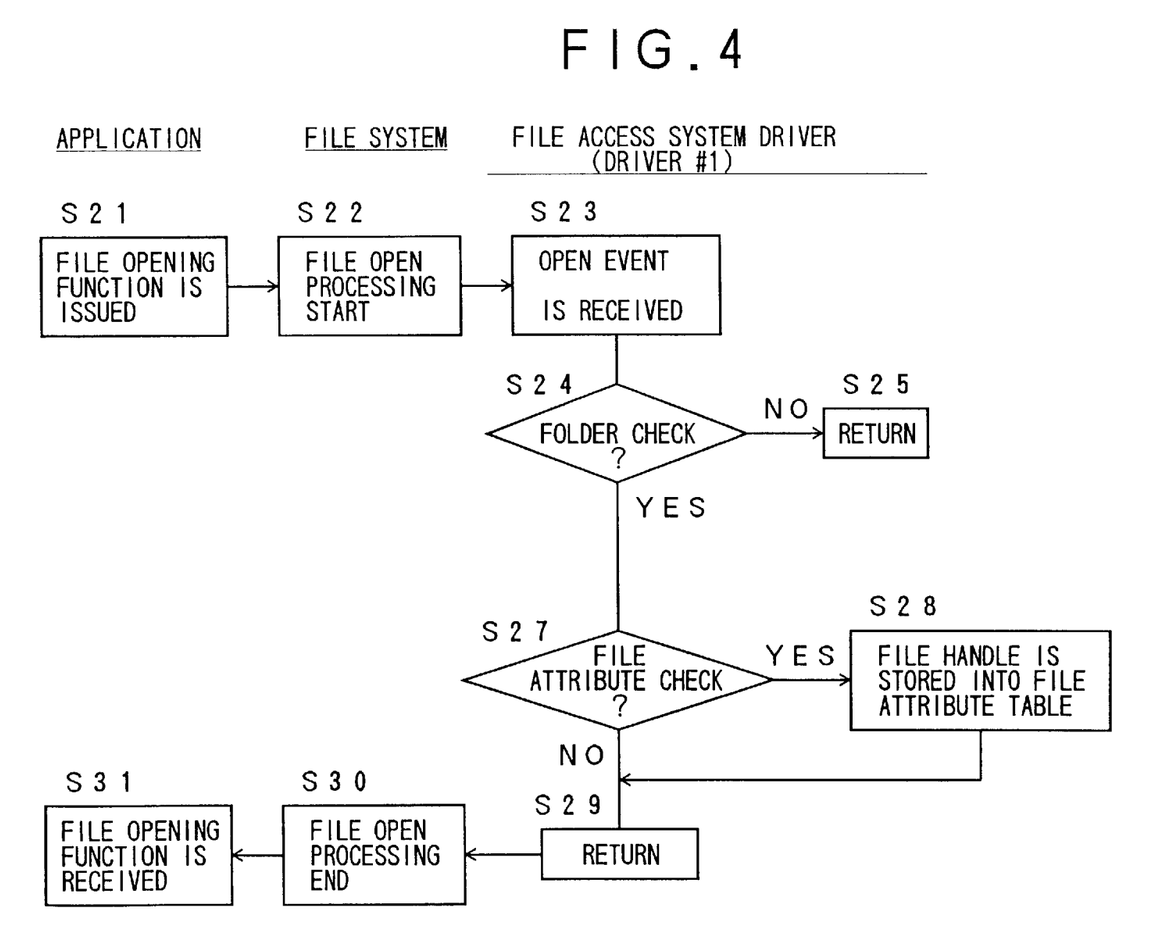
FIG. 4 is a flowchart for explaining a file open processing performed by the file access system.

FIG. 4 shows a file opening process performed by the file opening unit 5 of the file access system driver 4 before either the reading process or the writing process is started.

As shown in FIG. 4, the application 1 issues a file opening function to the file system 3 (S21). The file system 3 starts the file opening process to open a file within the external storage device 10 (S22).

When the file opening process is started in the above S22, the driver #1 (or the file opening unit 5) causes the CPU to receive an open event from the operating system (S23). The open event includes: a file name (including a path name); a file attribute; a file handle; file opening function parameters; a return address for the file system 3; and others.

The driver #1 causes the CPU to determine whether the portion of the user-level management table for the folder (indicated by the path name of the open event) indicates that the files in the folder have encrypted data and during the file accessing procedure the encryption/decryption must be performed after the reading/writing process (S24).

When the result of the above S24 is negative, it is determined that the files in the folder indicated by the path name of the open event have plaintext and during the file accessing procedure the encryption/decryption is not performed after the reading/writing process. The driver #1 causes the CPU to return to the return address for the file system 3 (S25).

When the result of the above S24 is affirmative, it is determined that the files in the folder indicated by the path name of the open event have encrypted data and during the file accessing procedure, the encryption/decryption must be performed after the reading/writing process. The driver #1 causes the CPU to determine whether the file attribute of the open event indicates that the file is irrelevant to the file accessing procedure (S27). For example, in cases of system files, hidden files and driver files, the file attributes of such files indicate that the files are irrelevant to the file accessing procedure. These files are excluded from the file accessing procedure.

When the result of the above S27 is affirmative, it is determined that the file is irrelevant to the file accessing procedure. The driver #1 causes the CPU to store the file handle of the open event into a file attribute table (not shown) (S28). After the updating of the file attribute table in the above S28 is performed, the driver #1 causes the CPU to return to the return address for the file system 3 (S29).

When the result of the above S27 is negative, it is determined that the file is relevant to the file accessing procedure. The driver #1 causes the CPU in the above S29 to return to the return address for the file system 3.

After the above step S29 is performed, the file system 3 finishes the file opening process (S30). The application 1 receives the file opening function from the file system 3 (S31).

Accordingly, when a file opening function is issued by the application 1, the file opening unit 5 of the file access system driver 4 causes the CPU to carry out the file opening process to open a file within the external storage device 10.

Figure 5:
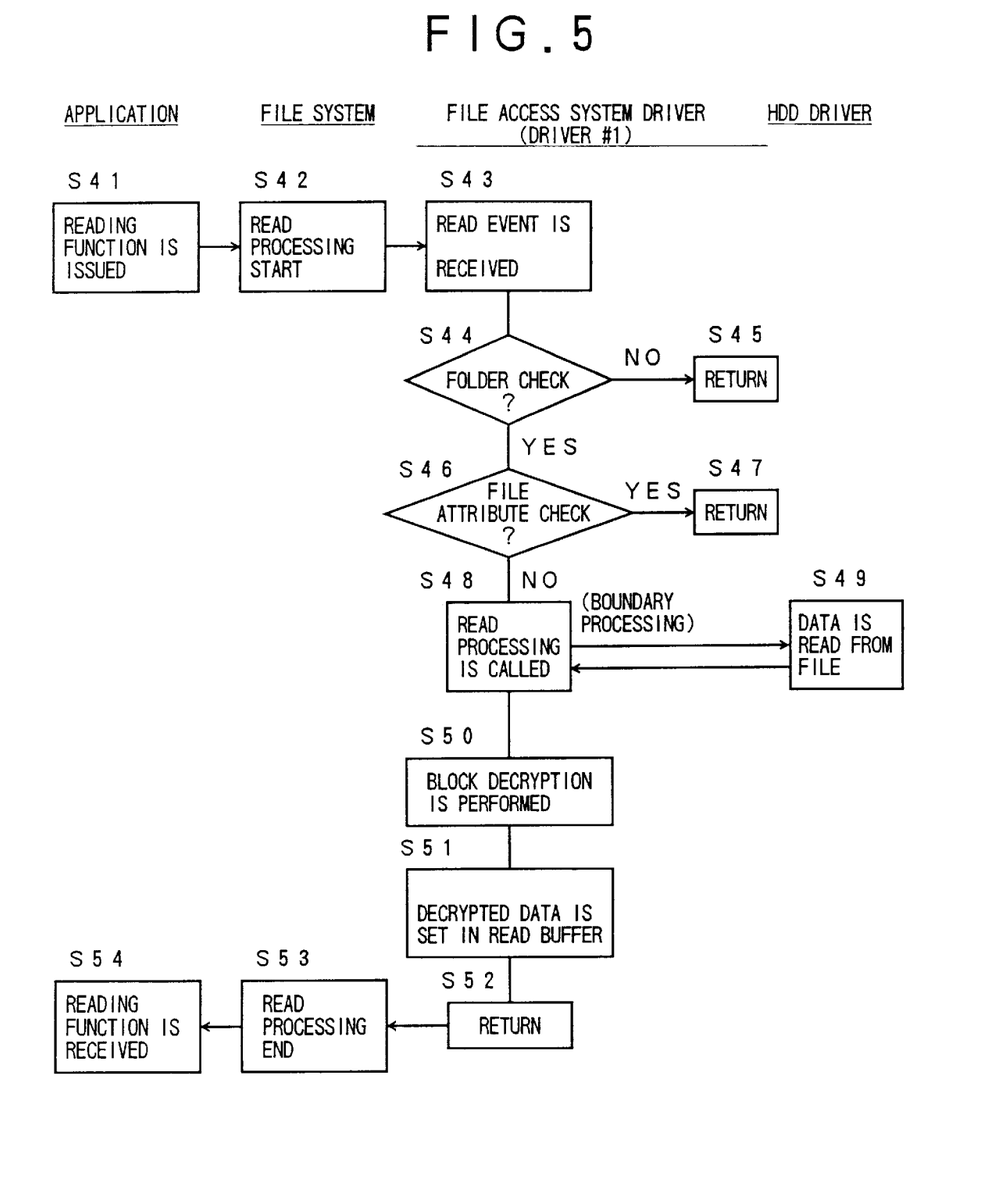
FIG. 5 is a flowchart for explaining a read processing performed by the file access system.

FIG. 5 shows a reading process performed by the reading unit 6 of the file access system driver 4 of the present embodiment.

As shown in FIG. 5, the application 1 issues a reading function to the file system 3 (S41). The file system 3 starts the reading process to read data from a given file within the external storage device 10 (S42).

When the reading process is started in the above S42, the driver #1 (or the reading unit 6) causes the CPU to receive a read event from the operating system (S43). The read event is called a reading request. The read event includes: a file name (including a path name); a file handle; a read point; a read buffer; a read size; a return address for the file system 3; and others.

When the read event is received in the above S43, the driver #1 causes the CPU to determine whether the portion of the user-level management table for the folder (indicated by the path name of the read event) indicates that the files in the folder have encrypted data and during the file accessing procedure the encryption/decryption must be performed after the reading/writing process (S44).

When the result of the above S44 is negative, it is determined that the files in the folder indicated by the path name of the read event have plaintext and during the file accessing procedure the encryption/decryption has not to be performed after the reading/writing process. The driver #1 causes the CPU to return to the return address for the file system 3 (S45). In this case, a normal reading process for the given file within the external storage device 10 is performed.

When the result of the above S44 is affirmative, it is determined that the files in the folder indicated by the path name of the read event have encrypted data and during the file accessing procedure the encryption/decryption must be performed after the reading/writing process. The driver #1 causes the CPU to determine whether the file handle of the read event is included in the file attribute table which has been updated in the file opening process (S46).

When the result of the above S46 is affirmative, it is determined that the given file is irrelevant to the file accessing procedure. The driver #1 causes the CPU to return to the return address for the file system 3 (S47). In this case, the normal reading process for the given file within the external storage device 10 is performed.

When the result of the above S46 is negative, it is determined that the file is relevant to the file accessing procedure. The driver #1 causes the CPU to call a reading process in a HDD driver of the external storage device 10 (S48). In this case, a boundary process is performed so as to read data from the given file within the external storage device 10.

The reading process of the HDD driver causes the CPU to read the encrypted data from the given file within the external storage device 10 through the boundary process (S49).

After the above step S49 is performed, the driver #1 causes the CPU to receive a fixed length (for examples, 8 bytes) of the encrypted data from the given file and generate a block of decrypted data of the same size by performing the decryption (S50). This procedure is called a block decryption.

After the above step S50 is performed, the driver #1 causes the CPU to determine a position of the fixed length of the decrypted data by a position indicated by the read event, so that the decrypted data is set in the read buffer (S51).

After the above step S51 is performed, the driver #1 causes the CPU to return to the return address for the file system 3 (S52).

After the above step S52 is performed, the file system 3 finishes the reading process (S53). The application 1 receives the reading function with the read buffer from the file system 3 (S54).

Accordingly, when a reading function is issued by the application 1, the reading unit 6 of the file access system driver 4 causes the CPU to carry out the reading process to read data from a given file within the external storage device 10. Specifically, when a portion of the user-level management table for a folder containing the file indicates that the files in the folder have encrypted data, the reading unit 6 receives a fixed length of the encrypted data from the file and generates a block of decrypted data of the same size by performing the block decryption. When the portion of the user-level management table for the folder indicates that the files in the folder have plaintext, the reading unit 6 returns the plaintext read from the file, to the application 1 without performing the decryption.

In the file access system driver 4 of the present embodiment, a simple decryption method is utilized to carry out the reading process. Therefore, it is possible for the file access system driver 4 of the present embodiment to efficiently access the given file within the external storage device. Further, in the file access system driver 4 of the present embodiment, it is difficult to discriminate between a block of encrypted data and a block of decrypted data since both blocks have the same size. Therefore, it is possible for the file access system driver 4 of the present embodiment to provide adequate security for information of the given file within the external storage device even after the accessing procedure for the file is finished.

Figure 6:
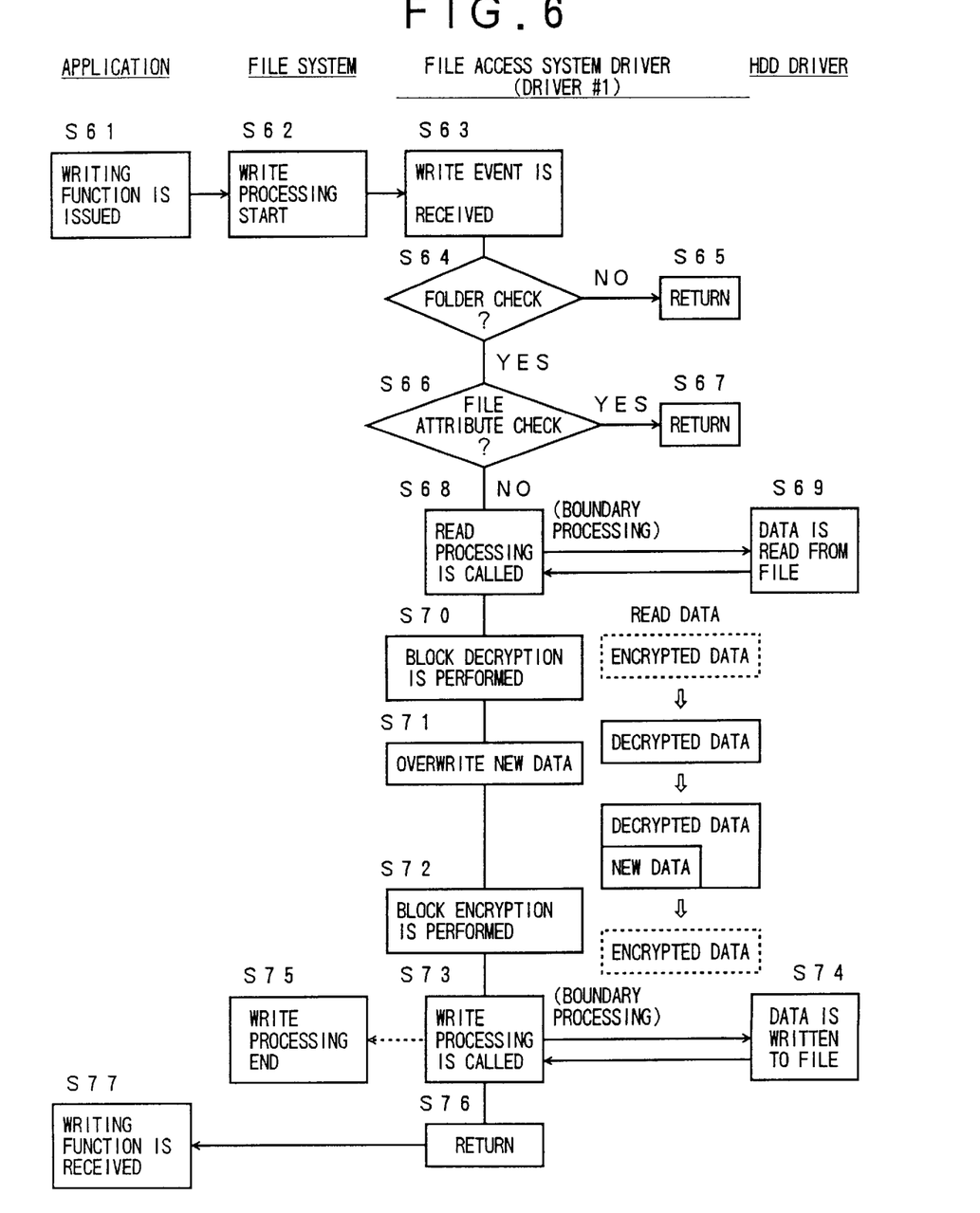
FIG. 6 is a flowchart for explaining a write processing performed by the file access system.

FIG. 6 shows a writing process performed by the writing unit 7 of the file access system driver 4 of the present embodiment.

As shown in FIG. 6, the application 1 issues a writing function to the file system 3 (S61). The file system 3 starts the writing process to write data to a given file within the external storage device 10 (S62).

When the writing process is started in the above S62, the driver #1 (or the writing unit 7) causes the CPU to receive a write event from the operating system (S63). The write event is called a writing request. The write event includes: a file name (including a path name); a file handle; a writing point; a writing buffer; a writing size; a return address for the file system 3; and others.

When the write event is received in the above S63, the driver #1 causes the CPU to determine whether the portion of the user-level management table for the folder (indicated by the path name of the writing event) indicates that the files in the folder have encrypted data and during the file accessing procedure the encryption/decryption must be performed after the reading/writing process (S64).

When the result of the above S64 is negative, it is determined that the files in the folder indicated by the path name of the write event have plaintext and during the file accessing procedure the encryption/decryption has not to be performed after the reading/writing process. The driver #1 causes the CPU to return to the return address for the file system 3 (S65). In this case, a normal writing process for the given file within the external storage device 10 is performed.

When the result of the above S64 is affirmative, it is determined that the files in the folder indicated by the path name of the write event have encrypted data and during the file accessing procedure the encryption/decryption must be performed after the reading/writing process. The driver #1 causes the CPU to determine whether the file handle of the write event is included in the file attribute table which has been updated in the file opening process (S66).

When the result of the above S66 is affirmative, it is determined that the given file is irrelevant to the file accessing procedure. The driver #1 causes the CPU to return to the return address for the file system 3 (S67). In this case, the normal writing process for the given file within the external storage device 10 is performed.

When the result of the above S66 is negative, it is determined that the file is relevant to the file accessing procedure. The driver #1 causes the CPU to call the reading process in the HDD driver of the external storage device 10 (S68). In this case, a boundary process is performed so as to read data from the given file within the external storage device 10.

The reading process in the HDD driver causes the CPU to read the encrypted data from the given file within the external storage device 10 through the boundary process (S69).

After the above step S69 is performed, the driver #1 causes the CPU to receive a fixed length (for examples, 8 bytes) of the encrypted data from the given file and generate a block of decrypted data of the same size by performing the block decryption (S70). Further, the driver #1 causes the CPU to determine a position of the fixed length of the decrypted data by a position indicated by the writing event.

After the above step S70 is performed, the driver #1 causes the CPU to overwriting new data from the writing buffer to the decrypted data which has been produced by the block decryption in the above step S70 (S71).

After the above step S71 is performed, the driver #1 causes the CPU to receive a fixed length (for example, 8 bytes) of the decrypted data from the decrypted data produced by the overwriting in the above S71 and generate a block of encrypted data of the same size by performing the encryption (S72). This encryption is called a block encryption.

After the above step S72 is performed, the driver #1 causes the CPU to call the write process of the HDD driver of the external storage device 10 (S73). In this case, a boundary process is performed so as to writing data to the given file within the external storage device 10.

The writing process of the HDD driver causes the CPU to writing the encrypted data from the driver #1 to the given file at the position indicated by the write event through the boundary process (S74).

After the above step S74 is performed, the file system 3 finishes the writing process (S75). The driver #1 causes the CPU to return to the return address for the file system 3 (S76). The application 1 receives the writing function from the file system 3 (S77).

Accordingly, when a reading function is issued by the application 1, the writing unit 7 of the file access system driver 4 causes the CPU to carry out the writing process to writing data from a given file within the external storage device 10. When a portion of the user-level management table for a folder containing the given file indicates that the files in the folder have encrypted data, the writing unit 7 receives a fixed length of the encrypted data from the file, generates a block of decrypted data of the same size by performing the block decryption, and overwrite new data from the writing buffer to the decrypted data. Further, the writing unit 7 receives a fixed length of the decrypted data from the data produced by the overwriting, and generates a block of encrypted data of the same size by performing the block encryption, so that the resulting data is written to the given file within the external storage device 10. When the portion of the user-level management table for the folder indicates that the files in the folder have plaintext, the writing unit 7 overwrite new data from the writing buffer to the plaintext read from the file and writings the resulting data to the file within the external storage device 10 without performing the decryption/encryption.

In the file access system driver 4 of the present embodiment, a simple encryption/decryption method is utilized to carry out the writing process. Therefore, it is possible for the file access system driver 4 of the present embodiment to efficiently access the given file within the external storage device. Further, in the file access system driver 4 of the present embodiment, it is difficult to discriminate between a block of encrypted data and a block of decrypted data since both blocks have the same size. Therefore, it is possible for the file access system driver 4 of the present embodiment to provide adequate security for information of the given file within the external storage device even after the accessing procedure for the file is finished.

Figure 7:
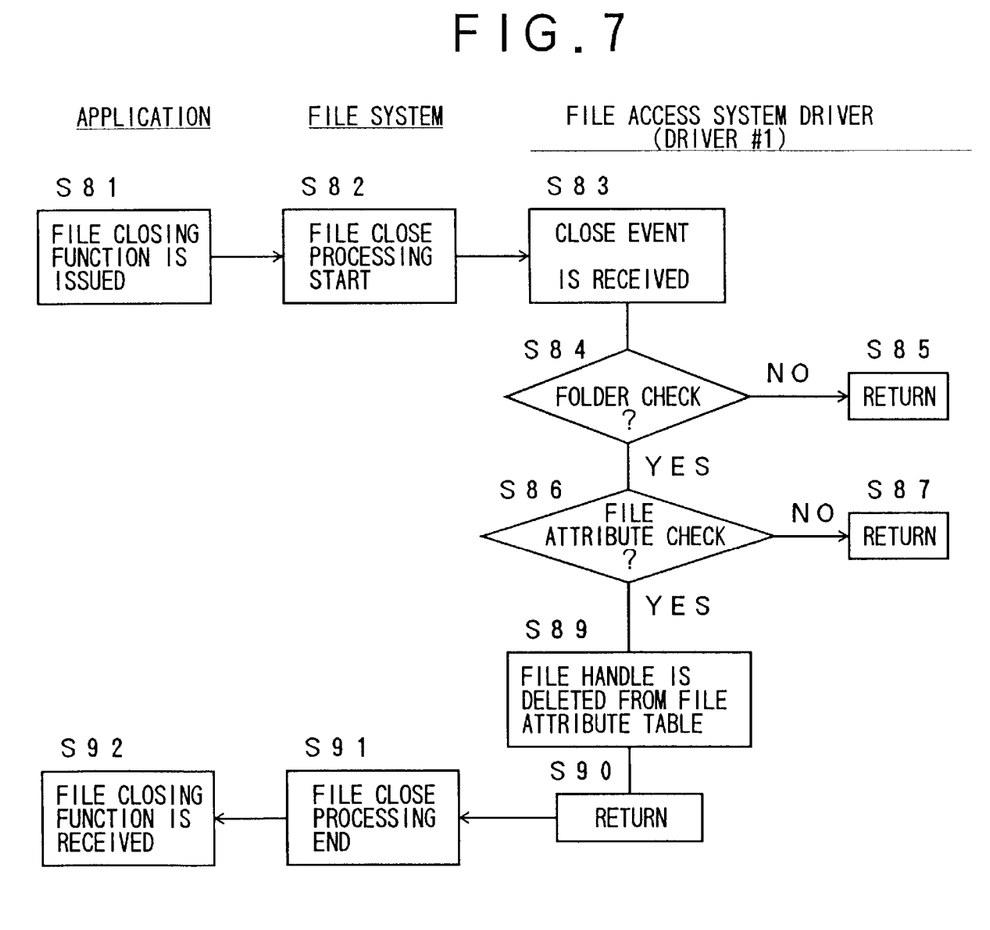
FIG. 7 is a flowchart for explaining a file close processing performed by the file access system.

FIG. 7 shows a file close process performed by the file closing unit 8 of the file access system driver 4 of the present embodiment after either the reading process or the writing process is performed.

As shown in FIG. 7, the application 1 issues a file closing function to the file system 3 (S81). The file system 3 starts the file closing process to close a file within the external storage device 10 (S82).

When the file closing process is started in the above S82, the driver #1 (or the file closing unit 8) causes the CPU to receive a close event from the operating system (S83). The close event includes: a file name; a file handle; a return address for the file system 3; and others.

The driver #1 causes the CPU to determine whether the portion of the user-level management table for the folder (indicated by the file name of the close event) indicates that the files in the folder have encrypted data (S84).

When the result of the above S84 is negative, it is determined that the files in the folder indicated by the file name of the close event have plaintext. The driver #1 causes the CPU to return to the return address for the file system 3 (S85). In this case, a normal file closing process for the given file within the external storage device 10 is performed.

When the result of the above S84 is affirmative, it is determined that the files in the folder indicated by the file name of the close event have encrypted data. The driver #1 causes the CPU to determine whether the file handle of the close event is included in the file attribute table which has been updated in the file opening process (S86).

When the result of the above S86 is negative, the driver #1 causes the CPU to return to the return address for the file system 3 (S87). In this case, the normal file closing process for the given file within the external storage device 10 is performed.

When the result of the above S86 is affirmative, the driver #1 causes the CPU to delete the file handle of the close event from the file attribute table (S89). After the updating of the file attribute table in the above S89 is performed, the driver #1 causes the CPU to return to the return address for the file system 3 (S90).

After the above step S90 is performed, the file system 3 finishes the file closing process (S91). The application 1 receives the file closing function from the file system 3 (S92).

Accordingly, when a file closing function is issued by the application 1, the file closing unit 8 of the file access system driver 4 causes the CPU to carry out the file close process to close a file within the external storage device 10.

As described above, in the file access system of the present invention, a simple encryption/decryption method is utilized to carry out the reading/writing process. It is not necessary for the present invention to generate a working file and encrypt/decrypt data of a given file to store the result of encryption/decryption in the working file. Therefore, the file access system of the present invention is effective in increasing the access speed at which a given file within the external storage device is accessed. Further, in the file access system of the present invention, it is difficult to discriminate between a block of encrypted data and a block of decrypted data since both blocks have the same size. Therefore, the file access system of the present invention is effective in providing adequate security for information of the given file within the external storage device even after the accessing procedure for the file is finished.

Further, the present invention is not limited to the above-described embodiments, and variations and modifications may be made without departing from the present invention.

What is claimed is:

1. A file access system in which a file within a storage device is accessed when a request is issued by an application program, comprising:
   a receiving unit receiving a read event in response to a reading request issued by the application program;
   a determining unit determining whether the file within the storage device has encrypted data based on the received read event, the determining unit performing said determination by checking if a portion of a registered management table for a corresponding folder for the file, the corresponding folder being indicated by the received read event, is set to indicate that files contained in the corresponding folder have encrypted data; and
   a reading unit receiving a fixed length of the encrypted data from the file when the file contains the encrypted data, said reading unit generating decrypted data of a same size as the fixed length by performing a decryption of the received encrypted data, a position of the fixed length of the decrypted data being determined by a position indicated by the received read event.

2. The file access system according to claim 1, further comprising a file opening unit opening the file within the storage device when a file opening request is issued by the application program.

3. The file access system according to claim 2, wherein said file opening unit determines whether the file is irrelevant to a file accessing procedure based on a file attribute of the file, and wherein, when the file is determined as being irrelevant to the file accessing procedure, said file opening unit stores a file handle of the file into a file attribute table.

4. A file access system in which a file within a storage device is accessed when a request is issued by an application program, comprising:
   a receiving unit receiving a read event in response to a reading request issued by the application program;
   a determining unit determining whether the file within the storage device has encrypted data based on the received read event, the determining unit performing said determination by checking if a portion of a registered management table for a corresponding folder for the file, the corresponding folder being indicated by the received read event, is set to indicate that files contained in the corresponding folder have encrypted data; and
   a reading unit receiving a fixed length of the encrypted data from the file when the file contains the encrypted data, said reading unit generating decrypted data by performing a decryption of the received encrypted data, a position of the fixed length of the decrypted data being determined by a position indicated by the received read event.

5. The file access system according to claim 4, further comprising a file opening unit opening the file within the storage device when a file opening request is issued by the application program.

6. A file access system in which a file within a storage device is accessed when a request is issued by an application program, comprising:
   a receiving unit receiving a write event in response to a writing request issued by the application program;
   a determining unit determining whether the file within the storage device has encrypted data based on the received write event, said determining unit performing the determination by checking if a portion of a registered management table for a corresponding folder for the file, the corresponding folder being indicated by the received write event, is set to indicate that files contained in the corresponding folder contain the encrypted data; and
   a writing unit receiving a fixed length of the encrypted data from the file when the file contains the encrypted data, said writing unit generating decrypted data of same size as the fixed length by performing a decryption of the received encrypted data, a position of the fixed length of the decrypted data being determined by a position indicated by the writing request, and the writing unit overwriting new data from the application program to the decrypted data, generating encrypted data of the same size as the fixed length by performing an encryption of the decrypted data produced by the overwriting and overwriting the encrypted data to the file at the position indicated by the writing request.

7. The file access system according to claim 6, further comprising a file opening unit opening the file within the storage device when a file opening request is issued by the application program.

8. The file access system according to claim 7, wherein said file opening unit determines whether the file is irrelevant to a file accessing procedure based on a file attribute of the file, and wherein, when the file is determined as being irrelevant to the file accessing procedure, said file opening unit stores a file handle of the file in a file attribute table.

9. A file access system in which a file within a storage device is accessed when a request is issued by an application program, comprising:

a receiving unit receiving a write event in response to a writing request issued by the application program;

a determining unit determining whether the file within the storage device has encrypted data based on the received write event, said determining unit performing the determination by checking if a portion of a registered management table for a corresponding folder for the file, the corresponding folder being indicated by the received write event, is set to indicate that files contained in the corresponding folder contain the encrypted data; and a writing unit receiving a fixed length of the encrypted data from the file when the file contains the encrypted data, said writing unit generating decrypted data by performing a decryption of the encrypted data, a position of the fixed length of the decrypted data being determined by a position indicated by the writing request, and said writing unit overwriting new data from the application program to the decrypted data, generating encrypted data by performing an encryption of the decrypted data produced by the overwriting, and overwriting the generated encrypted data to the file at the position indicated by the writing request.

10. The file access system according to claim 9, further comprising a file opening unit opening the file within the storage device when a file opening request is issued by the application program.

11. A computer readable medium storing program code causing a processor to carry out a file accessing procedure in which a file within a storage device is accessed when a request is issued by an application program, comprising:

a receiving program means for causing the processor to receive a read event in response to a reading request issues by the application program;

first program code means for causing the processor to determine whether the file within the storage device has encrypted data based on the received read event, the determination being performed by checking if a portion of a registered management table for a corresponding folder for the file, the corresponding folder being indicated by the received read event, is set to indicate that files contained in the corresponding folder contain the encrypted data; and second program code means for causing, when the file contains the encrypted data, the processor to receive a fixed length of the encrypted data from the file and generate decrypted data by performing a decryption of the received encrypted data, a position of the fixed length of the decrypted data being determined by a position indicated by the by the received read event.

12. A computer readable medium storing program code causing a processor to carry out a file accessing procedure in which a file within a storage device is accessed when a request is issued by an application program, comprising:

a receiving program means for causing the processor to receive a write event in response to a writing request issues by the application program;

first program code means for causing the processor to determine whether the file within the storage device has encrypted data based on the received write event, said determination being performed by checking if a portion of a registered management table for a corresponding folder for the file, the corresponding folder being indicated by the received write event, is set to indicate that files contained in the corresponding folder contain encrypted data;

second program code means for causing, when the file contains the encrypted data, the processor to receive a fixed length of the encrypted data from the file and generate decrypted data by performing a decryption of the received encrypted data, a position of the fixed length of the decrypted data being determined by a position indicated by the writing request;

third program code means for causing the processor to overwriting new data from the application program to the decrypted data;

fourth program code means for causing the processor to generate encrypted data by performing an encryption of the decrypted data produced by the overwriting, and overwriting the generated encrypted data to the file at the position indicated by the writing request.

13. A file accessing method, comprising:

receiving a read event in response to a reading request issued by the application program;

determining whether a file contains encrypted data based on the received read event by checking if a portion of a registered management table for a corresponding folder for the file, the corresponding folder being indicated by the received read event, is set to indicate that files contained in the corresponding folder contain the encrypted data; and receiving a fixed length of the encrypted data from the file when the file contains the encrypted data and generating decrypted data of a same size as the fixed length by decrypting the received encrypted data.

14. A file accessing method, comprising:

receiving a write event in response to a writing request issued by an application program;

determining whether a file contains encrypted data based on the received write event, by checking if a portion of a registered management table for a corresponding folder for the file, the corresponding folder being indicated by the received write event, is set to indicate that files contained in the corresponding folder contain the encrypted data;

receiving a fixed length of the encrypted data from the file when the file contains the encrypted data and generating decrypted data of a same size as the fixed length by decrypting the received encrypted data; and overwriting new data from the application program to the decrypted data, generating encrypted data of the same size as the fixed length by encrypting the decrypted data produced by the overwriting, and overwriting the encrypted data to the file at the position indicated by the writing request.

* * * * *

UNITED STATES PATENT AND TRADEMARK OFFICE
CERTIFICATE OF CORRECTION

PATENT NO.   : 6,378,071 B1
DATED        : April 23, 2002
INVENTOR(S)  : Takaaki Sasaki It is certified that error appears in the above-identified patent and that said Letters Patent is hereby corrected as shown below:

<u>Column 14,</u>
Lines 32 and 37, change "overwriting" to -- overwrite --.

Signed and Sealed this

Eighteenth Day of June, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,378,071 B1
DATED : April 23, 2002
INVENTOR(S) : Takaaki Sasaki

It is certified that error appears in the above-identified patent and that said Letters Patent is hereby corrected as shown below:

<u>Title page,</u>
Item [75], Inventors, change "Takaaki" to -- Takaoki --.

Signed and Sealed this

Twenty-seventh Day of August, 2002

Attest:

JAMES E. ROGAN
*Attesting Officer*     *Director of the United States Patent and Trademark Office*